United States Patent [19]
El-Hamamsy et al.

[11] Patent Number: 5,187,412
[45] Date of Patent: Feb. 16, 1993

[54] ELECTRODELESS HIGH INTENSITY DISCHARGE LAMP

[75] Inventors: Sayed-Amr A. El-Hamamsy, Schenectady; Harald L. Witting, Burnt Hills, both of N.Y.

[73] Assignee: General Electric Company, Schenectady, N.Y.

[21] Appl. No.: 850,477

[22] Filed: Mar. 12, 1992

[51] Int. Cl.⁵ .......................................... H05B 41/24
[52] U.S. Cl. ..................................... 315/248; 315/344
[58] Field of Search .................... 315/248, 344, 39; 313/111, 113, 607, 234; 362/296

[56] References Cited

U.S. PATENT DOCUMENTS

| | | | |
|---|---|---|---|
| 3,248,548 | 4/1966 | Booth | 315/248 |
| 4,080,545 | 3/1978 | Gallo | 313/111 |
| 4,099,090 | 7/1978 | Corth | 313/113 |
| 4,810,938 | 3/1989 | Johnson et al. | 315/248 |
| 4,812,702 | 3/1989 | Anderson | 315/344 |
| 4,950,059 | 8/1990 | Roberts | 362/296 |
| 4,972,120 | 11/1990 | Witting | 315/240 |
| 5,032,757 | 7/1991 | Witting | 315/248 |
| 5,039,903 | 8/1991 | Farrall | 315/248 |
| 5,057,750 | 10/1991 | Farrall | 315/344 |
| 5,059,868 | 10/1991 | El-Hamamsy | 315/248 |

OTHER PUBLICATIONS

Ingold, John H., "Glow Discharges at DC and Low Frequencies" from Gaseous Electronics, vol. I, edited by M. N. Hirsh and H. J. Oskam, Academic Press, New York, 1978, pp. 19–20.

Primary Examiner—Eugene R. Laroche
Assistant Examiner—A. Zarabian
Attorney, Agent, or Firm—Jill M. Breedlove; Marvin Snyder

[57] ABSTRACT

An electrodeless HID lamp of the type having an excitation coil disposed about an arc tube for exciting a plasma arc discharge therein includes a light-transmissive outer envelope disposed about the arc tube and a light-reflective coating on the upper portion of the arc tube. Thus, light emitted by the arc discharge radiates in a forward direction through the lower portion of the arc tube. An elongated support for the arc tube is situated within the outer envelope and extends in the forward direction through the corresponding lower end of the outer envelope. According to one embodiment, the arc tube support is tubular and contains therein a discharge starting aid. The lamp further preferably includes a getter disposed within the outer envelope for removing gaseous impurities therefrom. A getter support is attached to the upper end of the lamp envelope in order to optimize the position of the getter therein, while avoiding oxidation of the getter material during the lamp sealing process. Lamp efficacy and starting aid performance are improved, while getter operation is optimized.

12 Claims, 3 Drawing Sheets

ELECTRODELESS HIGH INTENSITY DISCHARGE LAMP

FIELD OF THE INVENTION

The present invention relates generally to electrodeless high intensity discharge (HID) lamps and, more particularly, to an improved lamp configuration therefor, resulting in higher efficacy, improved starting aid performance and optimized getter operation.

BACKGROUND OF THE INVENTION

In a high intensity discharge (HID) lamp, a medium to high pressure ionizable gas, such as mercury or sodium vapor, emits visible radiation upon excitation caused by passage of current through the gas. One class of HID lamps comprises inductively-coupled electrodeless lamps which generate an arc discharge by generating a solenoidal electric field in a high-pressure gaseous lamp fill. In particular, the lamp fill, or discharge plasma, is excited by radio frequency (RF) current in an excitation coil surrounding an arc tube. The arc tube and excitation coil assembly acts essentially as a transformer which couples RF energy to the plasma. That is, the excitation coil acts as a primary coil, and the plasma functions as a single-turn secondary. RF current in the excitation coil produces a time-varying magnetic field, in turn creating an electric field in the plasma which closes completely upon itself, i.e., a solenoidal electric field. Current flows as a result of this electric field, resulting in a toroidal arc discharge in the arc tube.

A practical excitation coil configuration avoids as much light blockage by the coil as possible in order to maximize light output. An exemplary coil configuration is described in commonly assigned U.S. Pat. No. 5,039,903 of G. A. Farrall, issued Aug. 13, 1991 and incorporated by reference herein. However, even though the excitation coil configuration of the Farrall patent is effective in avoiding much light blockage from the lamp, it is desirable to provide a new lamp configuration which increases light output even further.

SUMMARY OF THE INVENTION

An electrodeless HID lamp of the type having an excitation coil disposed about an arc tube for exciting a plasma arc discharge therein includes a light-transmissive outer envelope disposed about the arc tube and a light-reflective coating on the upper portion of the arc tube. Thus, light emitted by the arc discharge radiates in a forward direction through the lower portion of the arc tube. An elongated support for the arc tube is situated within the outer envelope and extends in the forward direction through the corresponding lower end of the outer envelope. According to one embodiment, the arc tube support is tubular and contains therein a discharge starting aid. The lamp further preferably includes getter means disposed within the outer envelope for removing gaseous impurities therefrom. A getter support is attached to the upper end of the lamp envelope in order to optimize the position of the getter therein, while avoiding oxidation and further contamination of the getter material during the lamp sealing process. According to one embodiment, the getter support extends through the lamp envelope and is used to mount the lamp in a fixture. In another embodiment, a retaining groove in the outer envelope is used for mounting the lamp in the fixture. Lamp efficacy and starting aid performance are improved, while getter operation is optimized by the configuration of the present invention.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
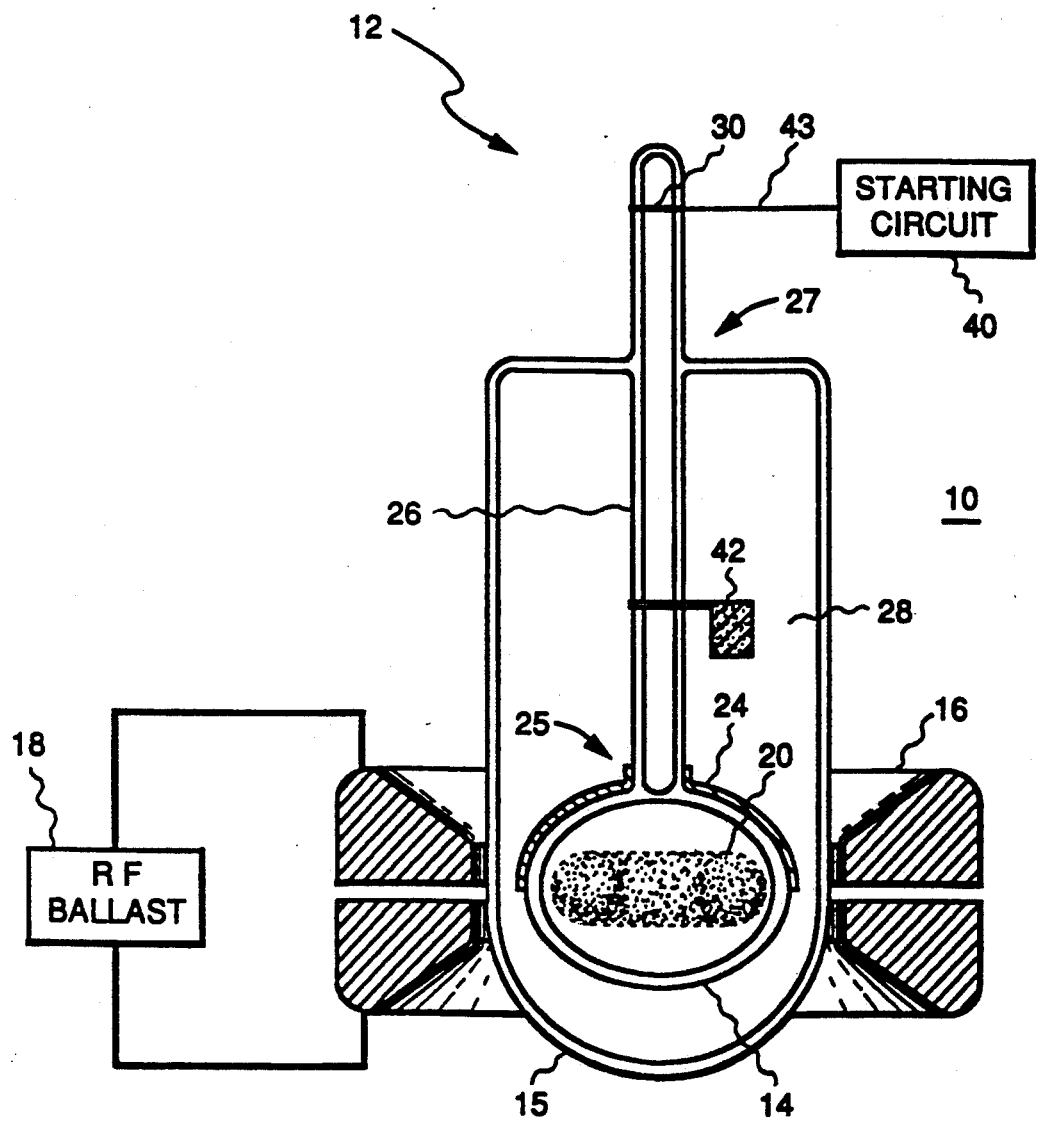
FIG. 1 is a cross sectional view of one configuration of an electrodeless HID lamp.

FIG. 1 illustrates an electrodeless HID lamp configuration, similar to that described in commonly assigned U.S. patent application No. 07/787,158 of Dakin et al., filed Nov. 4, 1991 and incorporated by reference herein. As shown, HID lamp 10 includes an arc tube 14 preferably formed of a high temperature glass, such as fused quartz, or an optically transparent or translucent ceramic, such as polycrystalline alumina. Typically, as shown, a light-transmissive envelope 15 surrounds arc tube 14 in order to reduce heat loss from the arc tube and to protect the arc tube wall from harmful surface contamination. An excitation coil 16 is disposed about arc tube 14, i.e., outside envelope 15, and is coupled to a radio frequency (RF) ballast 18 for exciting a toroidal arc discharge 20 therein. By way of example, arc tube 14 is shown as having a substantially ellipsoid shape. However, arc tubes of other shapes may be desirable, depending upon the application. For example, arc tube 14 may be spherical or may have the shape of a short cylinder, or "pillbox", having rounded edges, if desired.

A suitable arc tube fill is described in commonly assigned U.S. Pat. No. 4,810,938 of P. D. Johnson, J. T. Dakin and J. M. Anderson, issued on Mar. 7, 1989, which patent is incorporated by reference herein. The fill of the Johnson et al. patent comprises a sodium halide, a cerium halide and xenon combined in weight proportions to generate visible radiation exhibiting high efficacy and good color rendering capability at white color temperatures. For example, such a fill according to the Johnson et al. patent may comprise sodium iodide and cerium chloride, in equal weight proportions, in combination with xenon at a partial pressure of about 500 torr. Another suitable fill is described in commonly assigned U.S. Pat. No. 4,972,120 of H. L. Witting, issued Nov. 20, 1990, which patent is also incorporated by reference herein. The fill of the Witting patent comprises a combination of a lanthanum halide, a sodium halide, a cerium halide and xenon or krypton as a buffer gas. For example, a fill according to the Witting patent may comprise a combination of lanthanum iodide, sodium iodide, cerium iodide, and 250 torr partial pressure of xenon.

As illustrated in FIG. 1, RF power is applied to the HID lamp by RF ballast 18 via excitation coil 16 coupled thereto. Excitation coil is illustrated as comprising a two-turn coil having a configuration such as that described in U.S. Pat. No. 5,039,903 of G. A. Farrall, cited hereinabove. Such a coil configuration results in very high efficiency and causes minimal light blockage from the lamp. The overall shape of the excitation coil of the Farrall patent is generally that of a surface formed by rotating a bilaterally symmetrical trapezoid about a coil center line situated in the same plane as the trapezoid, but which line does not intersect the trapezoid. However, other suitable coil configurations may be used, such as that described in commonly assigned U.S. Pat. No. 4,812,702 of J. M. Anderson, issued Mar. 14, 1989, which patent is incorporated by reference herein. In particular, the Anderson patent describes a coil having six turns which are arranged to have a substantially V-shaped cross section on each side of a coil center line. Another suitable excitation coil may be of solenoidal shape, for example. Still another suitable excitation coil may be of a spiral type which conforms to, but is spaced apart from, at least a portion of the arc tube.

In operation, RF current in coil 16 results in a time-varying magnetic field which produces within arc tube 14 an electric field that completely closes upon itself. Current flows through the fill within arc tube 14 as a result of this solenoidal electric field, producing toroidal arc discharge 20 therein. Suitable operating frequencies for RF ballast 18 are in the range from 0.1 to 300 megahertz (MHz), exemplary operating frequencies being 6.78 MHz and 3.56 MHz.

A reflective coating 24 is preferably disposed on the outer surface of the upper hemisphere of arc tube 14. As described in Dakin et al. U.S. patent application No. 07/787,158, cited hereinabove, such a reflective coating is disposed on a portion of the arc tube nearest the excitation coil so that light that would otherwise be blocked thereby is usefully directed out of the arc tube. Specifically, light is directed in a forward direction through the lower portion of the arc tube. Such a reflective coating preferably covers between approximately 30% and 70% of the arc tube. Moreover, such a reflective coating is comprised of one or more electrically insulating materials, preferably one or more refractory insulating materials, such as alumina, silica, zirconia, titania, magnesia and tantala.

Arc tube 14 is illustrated as being supported within outer envelope 15 by an elongated, tubular support 26. According to one preferred embodiment, the arc tube wall and tubular support are each comprised of quartz. The tubular support extends through an opening at region 27 in the upper end of the outer envelope and is fused about its outer periphery to the upper end of the envelope to form a vacuum-tight seal. The space 28 between the outer envelope and the arc tube may be filled with an inert gas such as, for example, nitrogen or argon. Alternatively, space 28 may be evacuated.

At the region 25 wherein arc tube 14 is attached to tubular support 26, there is a gap in reflective coating 24. As a result, support 26 acts as a light pipe in the backward direction, i.e., in a direction opposite to the direction of useful light output, reducing the forward light output.

In the lamp of FIG. 1, tubular support 26 for arc tube 14 serves as a discharge starting aid of the type comprising a gas probe starter 12. Such a starting aid is described in commonly assigned U.S. patent application No. 07/622,247 of V. D. Roberts et al., filed Dec. 4, 1990, now allowed and incorporated by reference herein. The gas probe starter of V. D. Roberts et al. includes a starting electrode 30 coupled to a starting chamber, i.e., tubular support 26, which is attached to the outer wall of arc tube 14 and contains a gas. Specifically, starting electrode 30 is shown being situated about starting chamber, or support, 26 and in contact therewith. However, other suitable configurations (not shown) include situating the electrode either within the interior of the chamber or outside the chamber, but in close proximity thereto.

The gas in the starting chamber, or support 26, may comprise, for example, a rare gas, such as neon, krypton, xenon, argon, helium, or mixtures thereof, at a pressure in the range from approximately 0.5 to 500 torr, a preferred range being from approximately 5 to 40 torr. Preferably, the gas in chamber 26 is at a relatively low pressure as compared with that of the arc tube fill in order to promote even easier starting. For example, a suitable arc tube fill pressure may be approximately 200 torr while that of the gas in chamber 26 may be approximately 20 torr.

In order to start lamp 10, a starting voltage is applied to electrode 30 via a starting circuit 40, causing the gas in chamber 26 to break down, or ionize, and thus become conductive. The discharge in the starting chamber may be characterized as either a glow discharge or an arc discharge, depending upon the pressure of the gas in chamber 26. At the low-end of the aforementioned gas pressure range, the discharge is more likely to be characterized as a glow, while at the high-end of the gas pressure range, the discharge is more likely to be characterized as an arc. However, there is no generally accepted definition which distinguishes between glow and arc discharges. For example, as described by John H. Ingold in "Glow Discharges at DC and Low Frequencies" from Gaseous Electronics, vol. I, edited by M. N. Hirsh and H. J. Oskam, Academic Press, New York, 1978, pp. 19-20, one definition is based on electrode-related phenomena, and another is based on electron and particle temperatures.

As a result of the discharge current in the starting chamber, i.e., tubular support 26, a sufficiently high starting voltage is capacitively coupled to the inside surface of arc tube 14 which causes the high-pressure gaseous fill contained therein to break down, thereby initiating arc discharge 20. Once the arc discharge is initiated, the starting voltage is either removed from starting electrode 30, or the magnitude thereof is decreased to a sufficiently low value, so that the discharge current in chamber 26 is extinguished. That is, the gas contained in chamber 26 becomes essentially nonconductive, thus providing a high-impedance path between starting electrode 30 and arc tube 14. Hence, the arc tube is protected during lamp operation from capacitively coupled currents which would otherwise flow between the starting electrode and the arc tube.

HID lamp 10 is also shown as including getter means 42 for removing gaseous impurities which contaminate the space 28 between arc tube 14 and outer envelope 15. Such gaseous impurities are desorbed from the walls of the arc tube and the outer envelope and may include, as examples, water vapor, hydrogen, carbon monoxide, carbon dioxide and oxygen. By using getter means 42, a build up of gaseous impurities in outer envelope 15 is avoided, and lamp life is maximized.

A preferred embodiment of getter means 42 is shown in FIG. 1 as comprising a getter flag attached to tubular support 26. An exemplary getter flag comprises a metal foil having an active getter material disposed on the surfaces thereof, e.g., in the form of a sintered powder. Suitable metal foils are comprised of nickel, iron, steel and stainless steel. Suitable getter materials include the following combinations: zirconium-aluminum; zirconium-iron; and zirconium-nickel. Other suitable getter materials include barium, zirconium, cerium and titanium.

Getter materials, such as those described hereinabove, each typically have an optimum operating temperature. Exemplary optimum operating temperatures are in the range from approximately 300° C. to 400° C. Disadvantageously, in order to situate the getter means at the optimum operating temperature for the particular getter material, while also situating the getter means at a sufficient distance from the lamp sealing region 27 in order to avoid oxidation and further contamination of the getter during the lamp sealing process, the length of support 26 must be made too long for optimum operation of discharge starting aid 12. In particular, as the length of the discharge starting aid is increased, the more difficult it becomes to achieve a starting discharge.

Figure 2:
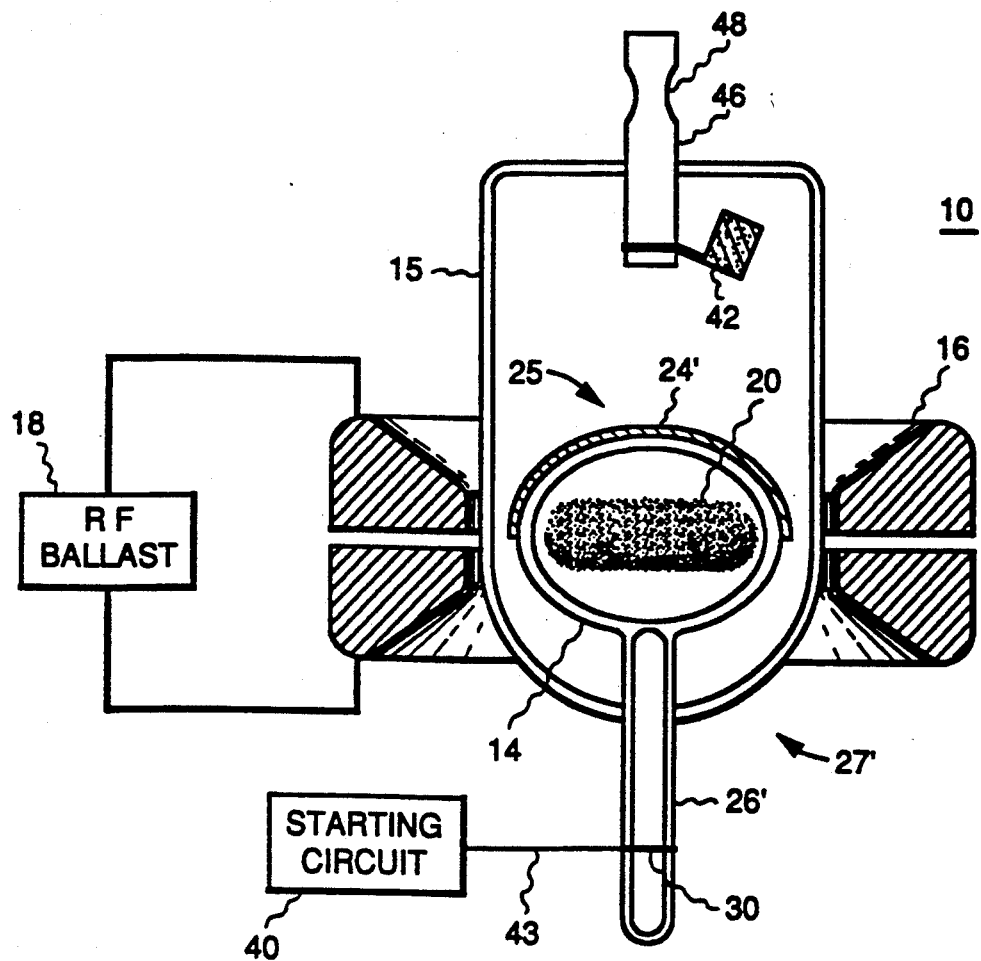
FIG. 2 is a cross sectional view of an electrodeless HID lamp configuration according to one embodiment of the present invention.

FIG. 2 illustrates an improved electrodeless HID lamp configuration according to the present invention. As shown, tubular support 26', and hence the gas probe starting chamber, extends through the lower end of envelope 15 such that reflective coating 24' covers the entire upper portion of arc tube 14, i.e., without any gaps. In this way, all light emitted by the arc discharge radiates in the forward direction through the lower portion of the arc tube. Furthermore, a relatively thin, stiff wire 43 is used to couple starting circuit 40 to electrode 30 such that a negligible amount of light is blocked thereby.

Additionally, as shown in FIG. 2, getter means 42 is not attached to support 26, but is attached to a separate getter support 46 at the upper end of the lamp envelope. Since the lamp sealing process occurs at the lower end of the lamp envelope at region 27', starting chamber 26' may be made relatively short with getter means 42 still situated at the optimum temperature for the particular getter material, while avoiding oxidation and further contamination of the getter material during the lamp sealing process. By way of example, in a lamp envelope having a length of approximately 6.5 cm in a lamp configured according to FIG. 2, the temperature of a getter in the space between arc tube 14 and the upper end of outer envelope 15 may range, for example, from about 600° C. closest to the arc tube to about 200° C. at the upper end of envelope 15. Advantageously, the optimum temperature for a wide range of getter materials can thus be accommodated.

Figure 3:
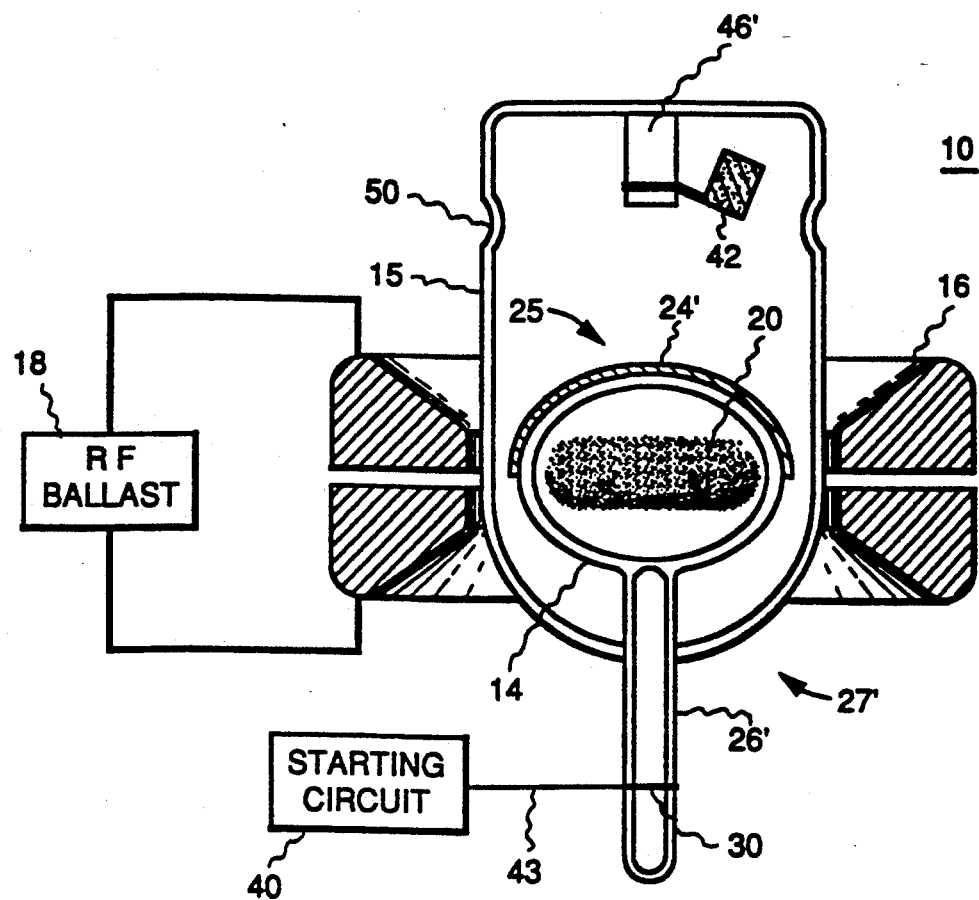
FIG. 3 is a cross sectional view of an electrodeless HID lamp configuration according to an alternative embodiment of the present invention.

According to the embodiment of FIG. 2, getter support 46 extends through the upper end of outer envelope 15 and has a retaining groove 48 therein for clamping into a lamp fixture (not shown). In an alternative embodiment, as illustrated in FIG. 3, a getter support 46' does not extend outside envelope 15. In the embodiment of FIG. 3, a retaining groove 50 is formed in lamp envelope 15 for clamping into a lamp fixture, as described in commonly assigned U.S. patent application No. 07/685,371 of R. A. Heindl et al., filed Apr. 15, 1991, which is incorporated by reference herein.

The following example is given to illustrate the increase in efficacy achieved using the lamp configuration of the present invention:

EXAMPLE

An ellipsoidal arc tube having an outside diameter of approximately 26 mm and an outside height of approximately 19 mm has a reflective coating on its upper half surface. The arc tube is supported in an outer envelope by a support tube having an outside diameter of approximately 7 mm. The support tube also functions as a gas probe starter. Assuming the reflective coating acts as a perfect reflector, approximately 4.3% of the light emitted by the arc discharge is lost along the support tube of FIG. 1. Therefore, in the lamps of FIGS. 2 and 3, lamp efficacy is increased by approximately 4.3%, while getter performance is optimized and discharge starting aid performance is improved.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. An electrodeless high intensity discharge lamp of the type having an excitation coil about an arc tube for exciting a plasma arc discharge therein, comprising:
    a light-transmissive outer envelope disposed about said arc tube;
    a continuous reflective coating disposed on the upper portion of said arc tube for reflecting light emitted by said arc discharge in a forward direction through the lower portion of said arc tube; and
    an elongated support for said arc tube situated within said outer envelope, said elongated support extending in said forward direction and through the corresponding lower end of said outer envelope.

2. The lamp of claim 1, further comprising:
    getter means disposed within said outer envelope for removing gaseous impurities therefrom.

3. The lamp of claim 2, further comprising getter support means for maintaining the position of said getter means in the region between said arc tube and the upper end of said outer envelope.

4. The lamp of claim 3 wherein said getter means is maintained at an optimum temperature for operation thereof.

5. The lamp of claim 3, further comprising means for mounting said outer envelope in a lamp fixture comprising an extension of said getter support means through the upper end of said outer envelope.

6. The lamp of claim 1, further comprising means for mounting said outer envelope in a lamp fixture, said means for mounting being situated toward the upper end of said lamp envelope.

7. The lamp of claim 6 wherein said means for mounting comprises a retaining groove formed in the upper end of said lamp envelope.

8. The lamp of claim 1 wherein said reflective coating covers approximately 30 to 70% of said arc tube.

9. The lamp of claim 1 wherein said elongated support for said arc tube further comprises a discharge starting aid for coupling a starting voltage to said arc tube for initiating said arc discharge therein.

10. The lamp of claim 9 wherein said discharge starting aid comprises a gas probe starter, said elongated support comprising a tubular starting chamber containing a starter fill for containing a starting discharge.

11. The lamp of claim 2 wherein said elongated support for said arc tube further comprises a discharge starting aid for coupling a starting voltage to said arc tube for initiating said arc discharge therein.

12. The lamp of claim 11 wherein said discharge starting aid comprises a gas probe starter, said elongated support comprising a tubular starting chamber containing a starter fill for containing a starting discharge.

* * * * *